United States Patent [19]

Kreczik

[11] 4,433,861
[45] Feb. 28, 1984

[54] ARRANGEMENT FOR CONNECTING TWO PIPE ENDS

[76] Inventor: Stefan Kreczik, Neudeck 3, 7101 Langen-Brettach, Fed. Rep. of Germany

[21] Appl. No.: 348,962

[22] Filed: Feb. 16, 1982

[51] Int. Cl.³ .............. F16L 37/00; F16L 21/02; F16L 13/14; F16L 55/00
[52] U.S. Cl. .................... 285/305; 285/369; 285/382; 285/417; 285/403; 285/47; 285/39
[58] Field of Search ............ 285/305, 108, 369, 382, 285/417, 403, 47, 39

[56] References Cited

U.S. PATENT DOCUMENTS

| | | | |
|---|---|---|---|
| 1,186,813 | 6/1916 | McFerran | 285/417 X |
| 2,021,241 | 11/1935 | Mall | 285/305 X |
| 3,266,821 | 8/1966 | Gafford | 285/369 X |
| 3,495,853 | 2/1970 | Furrer | 285/108 X |
| 3,698,747 | 10/1972 | Wing et al. | 285/305 |
| 4,059,295 | 11/1977 | Helm | 285/305 |
| 4,327,778 | 5/1982 | Williams | 285/47 X |

FOREIGN PATENT DOCUMENTS 651372  3/1951  United Kingdom ........... 285/305

OTHER PUBLICATIONS

IBM Technical Disclosure Bulletin, vol. 20, No. 9, Feb. 1978, pp. 3662–3663.

Primary Examiner—Richard J. Scanlan, Jr.
Attorney, Agent, or Firm—McCormick, Paulding & Huber

[57] ABSTRACT

A pipe connecting arrangement involves two pipes of different diameters which are inserted into one another with radial play. The radial space between the two pipes is filled with a packing sleeve and the connection is completed by one or two U-shaped tension hoops inserted through one or two slots in the larger diametered pipe and engaging the packing sleeve.

17 Claims, 9 Drawing Figures

ARRANGEMENT FOR CONNECTING TWO PIPE ENDS

The invention concerns an arrangement for connecting two pipe ends which are insertable into one another with radial play and which are made of a material which is at least semi-rigid. By pipes which are made of a material which is at least semi-rigid is meant such pipes which are not elastically deformable or which are only slightly elastically deformable, as for example pipes made of metal or a hard plastic. Previously it was customary in the case of such pipes, for example water pipes, to connect them by means of threaded connections, by compression connections or through the use of solder. In the case of threaded connections threads have to be cut on the ends of the pipes to be connected which is very time consuming. Compression connections are not suitable to all types of pipes and especially are not adapted for higher pressures. Insofar as the pipe material is amenable to soldering, as for example the copper or copper pipes, solder connections represent a very dependable type of connection, but they are very time consuming to make. Moreover, it is difficult to determine whether such a soldered connection is leak-proof.

The invention involves a solution to the problem of providing an arrangement of the foregoing type which makes possible a rapid connection of two pipe ends and which is reliable when used in connection with high pressures.

This problem is solved, in accordance with the invention, by the pipe end having the larger diameter carrying a packing jacket or sleeve which fills the radial space between the two pipe ends. The wall of the larger diametered pipe end within the axial extent of the packing sleeve has at least one slot extending perpendicular to the pipe axis and circumferentially over less than half of the circumference of the larger diametered pipe end, and the slot receives a generally horse-shoe shaped tension hoop whose thickness corresponds to the axial extent of the slot and which is insertable through the slot into the radial space between the two pipe ends so that it embraces at least half of the circumference of the smaller diametered pipe end.

Through the insertion of the tension hoop in the slot the material of the packing sleeve is pressed tightly around the smaller diametered pipe end. If necessary the smaller diametered pipe end is thereby locally slightly unelastically deformed so that in locations where it is not surrounded by the tension hoop it is pressed against the inner wall of the larger diametered pipe end. In practice it has been shown that in this way a leakless connection between the two pipe ends can be made in about one minute, whereas for a pipe connection using solder or made by means of a screw connection at least half an hour is required. Further, by the pipe connection of the invention no special work tools are required. A pliers or a hammer for driving the tension hoop into the slot is sufficient.

To guarantee a reliable connection in the case of higher pressures two slots are preferably provided and are arranged 180 degrees circumferentially from one another and axially adjacent one another so that the smaller diametered pipe end can be clamped around its entire circumference by two tension hoops opposing one another. So that an untight spot is not created between the two tension hoops themselves the slots are preferably arranged axially adjacent one another so that the axially adjacent edges of the slots lie in substantially a single plane. Therefore, the two tension hoops lie directly against one another so that they in combination serve essentially as a tension ring clamping the smaller diametered pipe end over its entire circumference. Preferably, the slots lie in a plane normal to the pipe axis. The slots therefore can be easily made by a cut in the pipe wall.

To inhibit the movement of the tension hoops out of the plane of the slot the larger diametered pipe end is provided on its inside circumference with an annular groove which extends in the axial direction over the width of both of the slots. Thereby the tension hoops are prevented from moving out of the plane of the slots by the engagement with the groove edges. The annular groove assures that the two sides of the inserted tension hoops which are facing one another lie close together.

On the one hand to ease the insertion of each tension hoop into its slot and on the other hand to inhibit cutting of the packing sleeve by the tension hoop the free ends of the tension hoop are provided with guide surfaces which on the one hand cooperate with the slot ends and on the other hand with the packing sleeve or with the outer circumference of the smaller diametered pipe as the free legs of the tension hoops are pushed into the radial space between the two pipe ends to be connected.

The tension hoop can be made so that through its insertion in the slot it becomes practically flush with the exterior surface of the larger diametered pipe end. In this case the tension hoop can practically no longer be pulled out of the slot and the connection between the two pipe ends can no longer be disassembled. Should it be desired that the connection between the two pipe ends be disassemblable, it is necessary that the tension hoop at its bent middle section be provided with a lug by means of which the tension hoop can again be drawn from the slot. This lug can include an eye in which a hook or the like can be inserted.

With the arrangement of the invention, long conducting pipes can be made from a number of assembled pipe sections each of which has one small diametered end and one large diametered end of the type previously described. A still more important application of the previously described arrangement arises in the case where the larger diametered pipe end is part of a pipe connecting piece which preferably has at least one additional similar pipe end for connection to another smaller diametered pipe end and in which the packing sleeves for the connecting ends of the pipe connecting piece are made in one piece with one another. For example, the pipe connecting piece can be built as a short cylindrical pipe piece that contains a packing sleeve extending along its entire length and which near both of its ends is provided with slots as described above. One such pipe connecting piece can therefore be used to connect together two pipe sections of similar diameter. The one-piece packing sleeve which extends therealong serves to make certain that between the pipe ends inserted in the connecting piece no untight spot can exist. Thereby the tightness of the connection is improved in that the pressure of the fluid flowing through the pipes press the packing sleeve against the inner wall of the pipe connecting piece. Despite the simpleness of the assembly this type of pipe connection can serve for exceptional pressures.

The two ends of the pipe connecting piece do not need to have similar diameters. With the aid of a pipe connecting piece in accordance with the invention pipes of different diameters can also be easily connected with one another. The pipe connecting piece can furthermore be built for example as a T-piece with three connecting ends. It can also include in addition to a connecting end of the type with which the invention is concerned a common screw connection.

According to a further feature of the invention it is proposed that the connecting arrangement be made entirely of metal. For this purpose the packing sleeve, in accordance with the invention, is manufactured out of a plastically deformable soft metal, such as soft copper. Such entirely metallic connectors are especially important for the connection of pipes through which gas and/or certain other fluids are conducted.

In the case of independent pipe connecting pieces these may be provided with a heat insulating jacket which for example may consist of a heat insulating plastic material. With the usual previous solder connections this was not possible because the insulating jacket would be destroyed by the heat of the solder. In the insulating jacket slots corresponding to those in the pipe end can be provided. With a thin insulating jacket it is also possible to stick the tension hoops through the insulation without first providing slots in the jacket. This simplifies the manufacture of the pipe connecting piece as it does not require further working of the surrounding jacket.

The following description explains the invention in connection with the drawings, in which.

Figure 1:
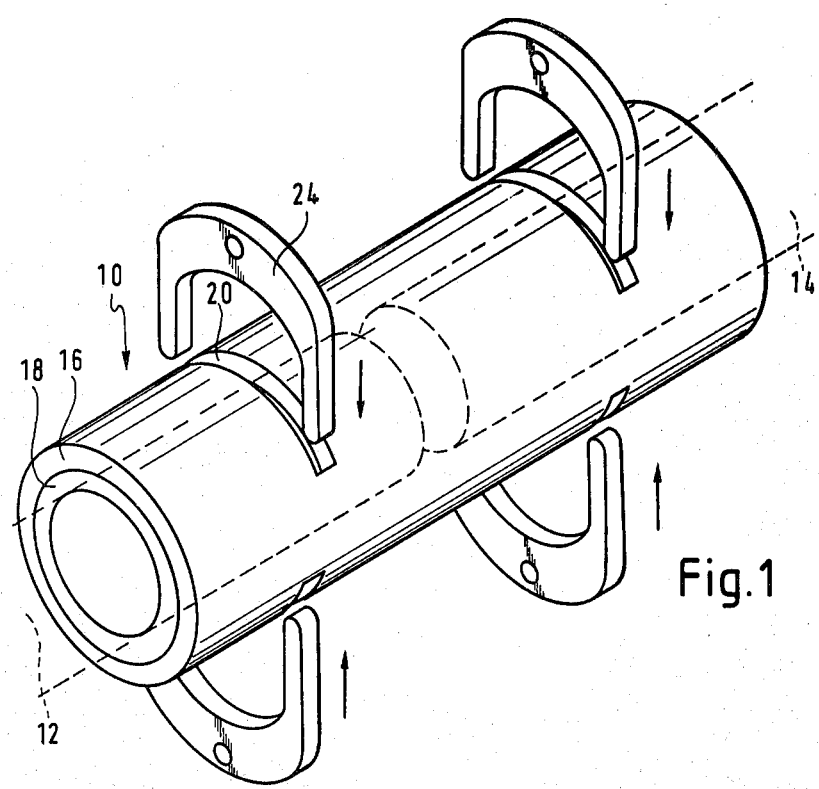
FIG. 1 is a perspective representation of a cylindrical pipe connecting piece for connecting two pipes of similar diameter.
Figure 2:
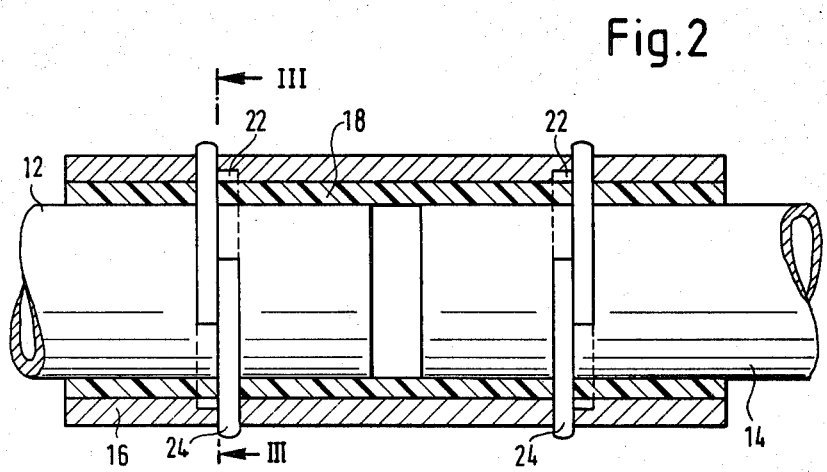
FIG. 2 is a cross sectional view taken on a vertical plane containing the longitudinal axis of two pipes of similar diameter connected by the help of the pipe connecting piece of FIG. 1.

In FIGS. 1 and 2 is shown a pipe connector, generally indicated by the reference numeral 10, for connecting two pipes 12 and 14 of similar diameter. The pipe connector 10 includes a cylindrical pipe piece 16, made of metal or a hard plastic, whose internal diameter is larger than the external diameter of the pipes 12 and 14 to be connected with one another. The radial space between the external circumferential surfaces of the pipes 12 and 14 and the internal circumferential surface of the pipe piece 16 is filled with a packing sleeve 18 which is pressed into the pipe piece 16 and which extends over the full length of the piece 16. The packing sleeve 18 consists, for example, of an elastically deformable packing material such as, for example, polytetrafluoroethylene. In the connection of the pipes which conduct certain gases or other fluids packing sleeves may be provided which are made of a deformable metal, such as for example soft copper, so that fluid tight connections may be made entirely of metal. Near each end of the pipe piece 16 are two slots 20 in the wall of the piece 16, the planes of which slots are arranged generally perpendicular to the pipe axis and which extend somewhat less than half of the pipe circumference. The two slots which are near the same end of the pipe piece are opposed relative to one another 180 degrees in the circumferential direction. Further, they are displaced in the axial direction relative to one another so that the adjacent edges of the two slots lie in the same transverse plane (see FIG. 2).

In the vicinity of the slots 20 the interior circumferential surface of the pipe piece 16 is milled to provide an annular groove 22, which in the axial direction extends for a length equal to the width of the two slots 20, as can be seen in FIG. 2.

Figure 3:
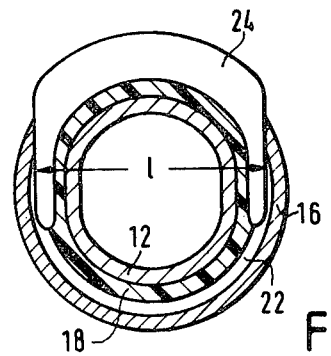
FIG. 3 is a transverse sectional view taken on the line III—III of FIG. 2.
Figure 4:
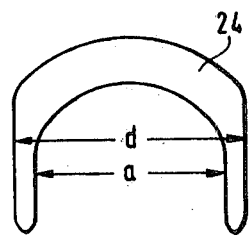
FIG. 4 is a plan view of one of the tension hoops of FIGS. 1, 2 and 3.
Figure 5:
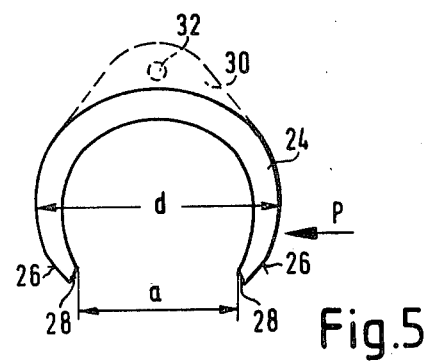
FIG. 5 is a plan view of another form of tension hoop which may be used in practicing the invention.

Each slot receives a U-shaped or a horseshoe-shaped tension hoop 24 such as, for example, shown individually in FIG. 4 or FIG. 5. The outer diameter of the curved middle section of the tension hoop 24 corresponds closely to the external diameter of the pipe piece 16. The largest external dimension d of the tension hoop in the vicinity of its legs (see FIGS. 4 and 5) is somewhat larger than the length 1 between the straight end faces of one of the slots 20 (see FIG. 3). The smallest internal dimension a (see FIGS. 4 and 5) between the free legs of the tension hoop 24 is somewhat smaller than the external diameter of the pipes 12 and 14.

To make a tight connection between the two pipes 12 and 14 these two pipes are inserted from opposite ends into the pipe piece 16 until their ends lie inside of their slots 20 so that the legs of the tension hoops 24 in the space between the pipes 12 and 14 will press at the same time on the pipe piece 16 and on the pipes 12 and 14. Since the dimension d of the tension hoop 24 is somewhat larger than the length 1 of the slot 20 the free ends of the tension hoop legs during insertion are pressed together and press the packing material of the packing sleeve 18 against the outer circumference of the pipes 12 and 14. Thereby not only is the packing sleeve 18 deformed but also the pipes 12 and 14 are deformed as shown in FIG. 3. The two tension hoops which are inserted in the two opposing slots 20 overlap one another and are guided by their coengaging surfaces past one another. Since they are also guided by the edges of the groove 22 they cannot be deflected out of the transverse plane of the slots. The opposed sides of the inserted tension hoops 24 therefore surround in this manner the entire circumference of the packing sleeve 18 and of the pipe 12 or 14. Because of the deformation of the pipe 12 or 14 in the vicinity of the tension hoops 24 the pipes 12 and 14 cannot be withdrawn from the connecting piece 16. Since the packing sleeve 18 extends over the entire length of the connecting piece 16 no leak can occur between the two connecting locations. It is also of value in the case of very high pressures that the packing sleeve 18 is reinforced throughout its entire circumferential length by the wall of the pipe piece 16.

To ease the insertion of the tension hoops 24 into the slots 20 the outer sides of the hoop legs, at least in the vicinity of their free ends, are made with guide surfaces 26. Further, to inhibit piercing or cutting of the hoop ends into the material of the packing sleeve 18 the inner sides of the hoop legs are provided near their ends with oblique surfaces 28.

Figure 6:
FIG. 6 is a side view of one of the free ends of the tension hoop of FIG. 5 with the view being taken in the direction of the arrow P of FIG. 5.

To assure that the two tension hoops 24 which are inserted in the same annular groove 22 do not hang up on one another the surfaces of the tension hoops which are transverse to the pipe axis are inclined at the free ends of each hoop leg as shown in FIG. 6.

The foregoing description shows that for the making of a leak-proof and mechanically tight pipe connection it is sufficient that the two pipes 12 and 14 to be connected with one another be inserted in the pipe connecting piece and the tension hoops driven in which can be done with the help of a pliers or a hammer so that the entire assembly requires hardly a minute.

Figure 7:
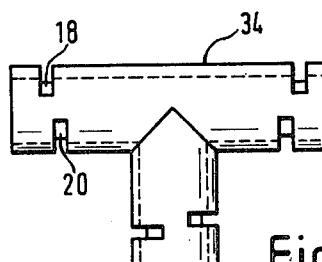
FIG. 7 is a side elevational view of a pipe connecting piece embodying the invention and for use in connecting together three pipes.
Figure 8:
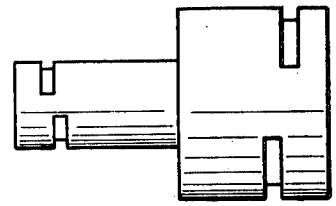
FIG. 8 is a side elevational view of a pipe connecting piece comprising another embodiment of the invention and for connecting two pipes of different diameter.

FIG. 7 shows a pipe connecting piece in the form of a T-piece with three pipe connectors. The pipe connecting piece is in this case provided with an insulating jacket 34 which, for example, is made of a plastic and which, for example, can be made by spraying onto a metal pipe connecting piece. The slots 20 can subsequently be made in the insulating jacket and in the metallic pipe connecting piece by sawing or milling in one step. Such an insulating jacket is of course possible with other shapes of pipe connecting pieces. FIG. 8 shows a pipe connecting piece for connecting two pipes with different diameters.

In the case of the pipe connecting pieces according to FIGS. 7 and 8 a one-piece packing sleeve can be obtained in a simple manner by injecting the pipe connecting piece with a plastic material and thereafter boring the plastic material to the desired diameters. In the case of the embodiment of FIG. 8, a preformed packing sleeve can also be inserted in the metallic connecting piece.

Figure 9:
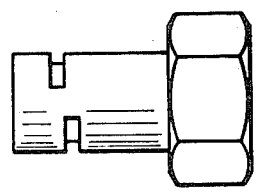
FIG. 9 is a side elevational view of a pipe connecting piece comprising still another embodiment of the invention and which at one of its ends has a screw-type connector.

Finally, FIG. 9 shows a pipe connecting piece which on one end is provided with a customary screw connector and on its other end with a connector according to the invention. Its versatility, its simple manufacturing and handling, as well as its high reliability even in the case of high pressures of the involved fluids, represent important advantages of the inventive pipe connector as opposed to the usual connector arrangements. In case a pipe connection is to be taken apart, each tension hoop 24 can be provided with a lug 30 (see FIG. 5) which in the inserted condition of the tension hoop extends beyond the circumference of the pipe connector piece 16. In the lug 30 an opening can further be provided so that with a hook or the like the tension hoop can be withdrawn from the slot 20.

I claim:

1. An arrangement for connecting two pipes which are insertable into one another with radial play and which are made of a material which is at least semi-rigid, characterized by two pipe ends of different diameter with the pipe end of smaller diameter inserted in the pipe end of larger diameter with a radial space between the two pipe ends, a packing sleeve arranged in said radial space between said two pipe ends and filling said radial space, the wall of the larger diametered pipe end having at least one radially outwardly open slot extending transversely to the pipe axis, which slot extends around less than half of the circumference of said larger diametered pipe end, a groove defined internally of said larger pipe end and radially aligned with said slot, a generally horseshoe-shaped tension hoop associated with said slot and having legs extending into said groove, the thickness of said tension hoop in its axial extent corresponding to the axial width of said slot and which tension hoop is inserted in said radial space between said two pipe ends, and said tension hoop legs being inserted in said groove at least half of the circumference of the smaller diameter one of said pipe ends and sufficiently compressing said packing sleeve radially as so inserted to connect and axially retain said smaller diameter pipe relative to said larger diameter pipe.

2. An arrangement according to claim 1 further characterized in that said larger diametered pipe end has two slots such as aforesaid which two slots are located 180 degrees from one another in the circumferential direction and are axially displaced so as to be axially adjacent one another.

3. An arrangement according to claim 2 further characterized in that the slots are axially displaced relative to one another so that the axially neighboring slot edges lie in substantially the same plane.

4. An arrangement according to claim 1, 2 or 3 further characterized in that each slot is located in a plane perpendicular to the pipe axis.

5. An arrangement according to claim 2 or 3 further characterized in that an annular groove is formed in the inner circumference of the larger diametered pipe end which annular groove in its axial direction has a width extending along the width of both of said slots.

6. An arrangement according to claim 1, 2 or 3 further characterized in that on the free ends of each tension hoop are first guide surfaces for cooperation with the ends of a slot and second guide surfaces for cooperation with said packing sleeve during the insertion of said tension hoop.

7. An arrangement according to claim 1, 2 or 3 further characterized in that each tension hoop is provided in its middle section with a lug.

8. An arrangement according to any one of claim 1, 2 or 3 further characterized in that the packing sleeve is made of polytetrafluoroethylene.

9. An arrangement according to any one of claim 1, 2 or 3 further characterized in that the packing sleeve is made of a plastically deformable metal.

10. An arrangement according to claim 9 further characterized in that the packing sleeve is made of soft copper.

11. An arrangement according to claim 1, 2 or 3 further characterized in that said larger diametered pipe end is part of a pipe connecting piece.

12. An arrangement according to claim 11 further characterized in that said pipe connecting piece includes at least one additional similar pipe end for connection to another smaller diametered pipe end and that the packing sleeves of said connecting ends of the pipe connecting piece are made of one piece with one another.

13. An arrangement according to claim 11 further characterized in that said pipe connecting piece includes at least one screw connector for connection to another pipe.

14. An arrangement according to claim 11 further characterized in that said pipe connecting piece includes an insulating jacket.

15. An arrangement according to claim 14 further characterized in that said insulating jacket is made of a heat insulating plastic material.

16. An arrangement according to claim 1 further characterized in that said slot has a transverse extent slightly less than the outside dimension of said hoop legs in their non-compressed condition whereby said hoop legs are adapted to so compress said sleeve upon insertion.

17. An arrangement according to claim 16 further characterized by said groove having a generally annular configuration and having a radial depth slightly greater than the outside dimension of said hoop legs.

* * * * *